(12) United States Patent
Landon et al.

(10) Patent No.: US 8,257,805 B2
(45) Date of Patent: *Sep. 4, 2012

(54) INSULATED GLASS UNIT POSSESSING ROOM TEMPERATURE-CURABLE SILOXANE-CONTAINING COMPOSITION OF REDUCED GAS PERMEABILITY

(75) Inventors: Shayne J. Landon, Ballston Lake, NY (US); David A. Williams, Ganesvoort, NY (US); Vikram Kumar, Bangalore (IN); Edward J. Nesakumar, Bangalore (IN); Indumathi Ramakrishnan, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 642 days.

This patent is subject to a terminal disclaimer.

(21) Appl. No.: 11/328,384

(22) Filed: Jan. 9, 2006

(65) Prior Publication Data

US 2007/0160781 A1 Jul. 12, 2007

(51) Int. Cl.
*E06B 3/00* (2006.01)
(52) U.S. Cl. ......... 428/34; 428/429; 428/447; 52/786.1; 52/786.13
(58) Field of Classification Search .............. 428/34, 428/429, 447; 52/204.593, 204.595, 204.62, 52/204.705, 204.71, 786.1, 786.12, 786.13; 525/106
See application file for complete search history.

(56) References Cited

U.S. PATENT DOCUMENTS

| | | | |
|---|---|---|---|
| 4,131,589 A | 12/1978 | Smith, Jr. | |
| 4,138,387 A * | 2/1979 | Bluestein | 524/425 |
| 4,699,940 A | 10/1987 | Gerace et al. | |
| 4,710,411 A | 12/1987 | Gerace et al. | |
| 5,088,258 A * | 2/1992 | Schield et al. | 52/204.593 |
| 5,120,379 A | 6/1992 | Noda et al. | |
| 5,514,734 A * | 5/1996 | Maxfield et al. | 523/204 |
| 5,567,530 A | 10/1996 | Drujon et al. | |
| 5,576,054 A | 11/1996 | Brown | |
| 5,653,073 A | 8/1997 | Palmer | |
| 5,744,703 A * | 4/1998 | Krenceski et al. | 73/54.01 |
| 5,804,253 A | 9/1998 | Hagiwara et al. | |
| 5,849,832 A | 12/1998 | Virnelson et al. | |
| 5,855,972 A | 1/1999 | Kaeding | |
| 6,055,783 A | 5/2000 | Guhl et al. | |
| 6,136,446 A | 10/2000 | Virnelson et al. | |
| 6,136,910 A | 10/2000 | Virnelson et al. | |
| 6,150,441 A | 11/2000 | Chiba et al. | |
| 6,153,691 A * | 11/2000 | Gornowicz et al. | 524/861 |

(Continued)

FOREIGN PATENT DOCUMENTS

CA 2054854 A1 5/1992

(Continued)

OTHER PUBLICATIONS

Shelly D. Burnside et al., Synthesis and Properties of New Poly(dimelthylsiloxane) Nanocomposites, ACS Publications, vol. 7, Sep. 1995, p. 1597-1600.*

(Continued)

*Primary Examiner* — Humera Sheikh
*Assistant Examiner* — Walter Moore
(74) *Attorney, Agent, or Firm* — Dominick G. Vicari

(57) ABSTRACT

The invention relates to a high thermal efficiency, insulated glass unit structure sealed with a cured composition containing, inter alia, diorganopolysiloxane(s) and organic nanoclay(s), the cured composition exhibiting low permeability to gas(es).

17 Claims, 2 Drawing Sheets

U.S. PATENT DOCUMENTS

| | | | |
|---|---|---|---|
| 6,238,755 B1 | 5/2001 | Harvey et al. | |
| 6,284,360 B1 | 9/2001 | Johnson et al. | |
| 6,301,858 B1 | 10/2001 | Crandell | |
| 6,312,817 B1 * | 11/2001 | Chen et al. | 428/447 |
| 6,372,827 B2 | 4/2002 | Johnson et al. | |
| 6,406,782 B2 | 6/2002 | Johnson et al. | |
| 6,445,158 B1 | 9/2002 | Bertness et al. | |
| 6,457,294 B1 | 10/2002 | Virnelson et al. | |
| 6,686,002 B2 | 2/2004 | Auerbach et al. | |
| 6,713,547 B2 | 3/2004 | Barbee et al. | |
| 6,784,272 B2 | 8/2004 | Mack et al. | |
| 6,796,102 B2 | 9/2004 | Virnelson et al. | |
| 6,803,412 B2 | 10/2004 | Nguyen-Misra et al. | |
| 6,812,272 B2 | 11/2004 | Fischer | |
| 6,822,035 B2 | 11/2004 | Chaiko | |
| 6,828,403 B2 | 12/2004 | Mahdi et al. | |
| 6,889,480 B2 | 5/2005 | Guhl et al. | |
| 7,625,976 B2 * | 12/2009 | Landon et al. | 524/588 |
| 7,674,857 B2 * | 3/2010 | Landon et al. | 525/100 |
| 2002/0091186 A1 | 7/2002 | Auerback | |
| 2002/0100550 A1 | 8/2002 | Mahdi et al. | |
| 2002/0119266 A1 | 8/2002 | Bagrodia et al. | |
| 2002/0194813 A1 | 12/2002 | Virnelson et al. | |
| 2004/0127629 A1 | 7/2004 | Jacob et al. | |
| 2004/0149370 A1 | 8/2004 | Auerbach | |
| 2004/0180154 A1 | 9/2004 | Wang et al. | |
| 2004/0180155 A1 | 9/2004 | Nguyen-Misra | |
| 2004/0188016 A1 | 9/2004 | Mahdi et al. | |
| 2004/0249033 A1 | 12/2004 | Auerbach | |
| 2005/0113498 A1 | 5/2005 | Auerbach | |
| 2005/0192387 A1 | 9/2005 | Williams et al. | |
| 2005/0203235 A1 | 9/2005 | Gong et al. | |
| 2007/0116907 A1 * | 5/2007 | Landon et al. | 428/34 |
| 2010/0098888 A1 * | 4/2010 | Landon et al. | 428/34 |

FOREIGN PATENT DOCUMENTS

| | | |
|---|---|---|
| CA | 2540893 A1 | 12/2005 |
| DE | 41 36 689 | 5/1992 |
| EP | 0252372 | 1/1988 |
| EP | 0312 967 | 4/1989 |
| EP | 0312967 A1 | 4/1989 |
| EP | 0520777 | 12/1992 |
| EP | 0857761 | 8/1998 |
| FR | 1411 160 | 9/1965 |
| GB | 1426763 | 3/1976 |
| GB | 1536051 | 12/1978 |
| GB | 2249552 | 5/1992 |
| WO | WO 97/31057 | 8/1997 |
| WO | WO 02064676 | 8/2002 |

OTHER PUBLICATIONS

Academic Press Dictionary of Science and Technology. Oxford: Elsevier Science & Technology. Retrieved Jun. 24, 2009, from http://www.credoreference.com/entry/apdst/quaternary_ammonium_salt.*

Peter C. LeBaron et al., "Clay Nanolayer Reinforcement of a Silicone Elastomer", Aug. 2001.

Shelly D. Burnside et al., "Nanostructure and Properties of Polysiloxane-Layered Silicate Nanocomposites", Mar. 28, 2000.

K. Mizoguchi et al., "Miscibility and gas permeability of poly (ethylene-co-5,4 mol% 3,5,5-trimethylhexyl methacrylate)-polydimethyl-siloxane blends", 1997.

Y. Geerts et al., "Morphology and Permeability of Polymer Blends-I. Crosslinked EPDM-Silicone Blends", Feb. 1996.

* cited by examiner

ARGON PERMEABILITY COEFFICIENT IN BARRERS

ARGON PERMEABILITY COEFFICIENT IN BARRERS

INSULATED GLASS UNIT POSSESSING ROOM TEMPERATURE-CURABLE SILOXANE-CONTAINING COMPOSITION OF REDUCED GAS PERMEABILITY

FIELD OF THE INVENTION

This invention is generally related to thermally insulating structures, and more particularly to a high thermal efficiency, insulated glass unit structure sealed with a room temperature-cured composition exhibiting low permeability to gas, or mixtures of gases.

BACKGROUND OF THE INVENTION

Room temperature-curable (RTC) compositions are well known for their use as sealants. In the manufacture of Insulating Glass Units (IGU) panels of glass are placed parallel to each other and sealed at their periphery such that the space between the panels, or the inner space, is completely enclosed. The inner space is typically filled with air. The transfer of energy through an insulating glass unit of this typical construction is reduced, due to the inclusion of the insulating layer of air in the inner space, as compared to a single panel of glass. The energy transfer may be further reduced by increasing the separation between the panels to increase the insulating blanket of air. There is a limit to the maximum separation beyond which convection within the air between the panels can increase energy transfer. The energy transfer may be further reduced by adding more layers of insulation in the form of additional inner spaces and enclosing glass panels. For example three parallel spaced apart panels of glass separated by two inner spaces and sealed at their periphery. In this manner the separation of the panels is kept below the maximum limit imposed by convection effects in the airspace, yet the overall energy transfer can be further reduced. If further reduction in energy transfer is desired then additional inner spaces can be added.

Additionally, the energy transfer of sealed insulating glass units may be reduced by substituting the air in a sealed insulated glass window for a denser, lower conductivity gas. Suitable gases should be colorless, non-toxic, non-corrosive, non-flammable, unaffected by exposure to ultraviolet radiation, and denser than air, and of lower conductivity than air. Argon, krypton, xenon, and sulfur hexaflouride are examples of gases which are commonly substituted for air in insulating glass windows to reduce energy transfer.

Various types of sealants are currently used in the manufacture of insulated glass units including both curing and non-curing systems. Liquid polysulphides, polyurethanes and silicones represent curing systems, which are commonly used, while polybutylene-polyisoprene copolymer rubber based hot melt sealants are commonly used non-curing systems.

Liquid polysulphides and polyurethanes are generally two component systems comprising a base and a curing agent that are then mixed just prior to application to the glass. Silicones may be one component as well as two component systems. Two component systems require a set mix ratio, two-part mixing equipment and cure time before the insulating glass units can be moved onto the next manufacturing stage.

However, current RTC silicone sealant compositions, while effective to some extent, still have only a limited ability to prevent the loss of low thermal conductivity gas, e.g., argon, from the inner space of an IGU. As a result of this permeability, the reduced energy transfer maintained by the gas between the panels of glass is lost over time.

A need therefore exists for an IGU with a RTC composition of reduced gas permeability compared to that of known RTC compositions. When employed as the sealant for an IGU, an RTC composition of reduced gas permeability will retain the intra-panel insulating gas of an IGU for a longer period of time compared to that of a more permeable RTC composition and will therefore extend the insulating properties of the IGU over a longer period of time.

SUMMARY OF THE INVENTION

The present invention relates to an insulated glass unit with increased thermal insulation stability. Specifically, the present invention relates to an insulated glass unit which comprises at least two spaced-apart sheets (panes) of glass, or of other functionally equivalent material, in spaced relationship to each other, a low thermal conductivity gas therebetween and a gas sealant assembly including a cured, i.e., crosslinked or vulcanized, curable sealant composition comprising:
  a) at least one silanol-terminated diorganopolysiloxane;
  b) at least one crosslinker for the silanol-terminated diorganopolysiloxane(s);
  c) at least one catalyst for the crosslinking reaction;
  d) at least one organic nanoclay, and, optionally,
  e) at least one solid polymer having a permeability to gas that is less than the permeability of the crosslinked diorganopolysiloxane(s).

When used as a component of the gas sealant assembly of an IGU, the foregoing cured sealant composition reduces the loss of gas(es) from the IGU thus extending its useful service life.

DETAILED DESCRIPTION OF THE INVENTION

In accordance with the present invention, an insulated glass unit comprising increased thermal insulation stability is provided with at least two spaced-apart sheets of glass in spaced relationship to each other, a low thermal conductivity insulating gas or mixture of gases therebetween and a gas sealant element including a cured sealant composition resulting from the curing of a curable sealant composition comprising: a) at least one silanol-terminated diorganopolysiloxane; b) at least one crosslinker for the silanol-terminated diorganopolysiloxane(s); c) at least one catalyst for the crosslinking reaction; d) at least one organic nanoclay filler; and, optionally, e) at least one solid polymer having a permeability to gas that is less than the permeability of the crosslinked diorganopolysiloxane(s).

Figure 1:
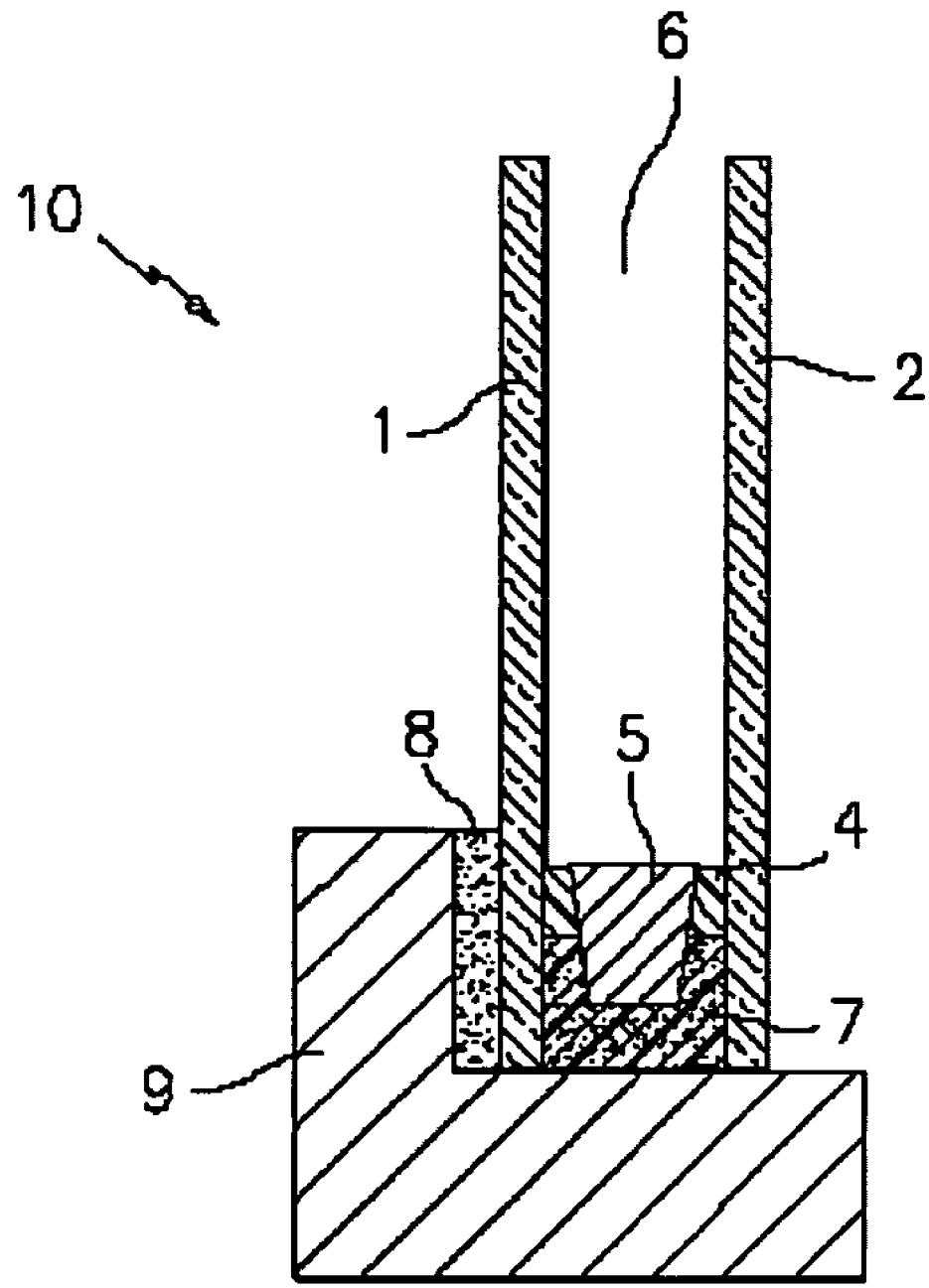
FIG. 1 is a sectional side view of a double glazed insulated glass unit (IGU) possessing a gas sealant assembly which includes a cured sealant composition in accordance with the invention.

With reference to FIG. 1, insulated glass unit 10 of known and conventional construction includes glass sheets 1 and 2 maintained in spaced-apart relationship by a gas sealant assembly possessing a primary gas sealant member 4, continuous spacer member 5 and low gas permeable sealant composition 7 prepared as hereinafter described, space 6 between sheets 1 and 2 being filled with an insulating gas or gases such as argon. A glazing bead 8, as known in the art, is placed between glass sheets 1 and 2 and window frame 9. Panes 1 and 2 can be fabricated from any of a variety of materials such as glass, e.g., clear float glass, annealed glass, tempered glass, solar glass, tinted glass, e.g., low energy glass, etc., acrylic resin and polycarbonate resin, and the like.

The inclusion of cured sealant composition 7 in the foregoing gas sealant assembly provides improved gas barrier characteristics and moisture leakage characteristics relative to known and conventional gas sealants. As a result, cured sealant composition 7 provides for longer in-service performance of insulated glass units of all manner of construction including that specifically described above.

Primary sealant member 4 of the insulated glass unit can be comprised of polymeric materials known in the art, for example, rubber base materials such as polyisobutylene, butyl rubber, polysulfide, EPDM rubber, nitrile rubber, and the like. Other useful materials include, polyisobutylene/polyisoprene copolymers, polyisobutylene polymers, brominated olefin polymers, copolymers of polyisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, styrene butadiene polymers, and the like.

As indicated above, primary gas sealant member 4 can be fabricated from a material such as polyisobutylene which has very good sealing properties. Glazing bead 8 is a sealant that is sometimes referred to as the glazing bedding and can be provided in the form of a silicone or butyl rubber. A desiccant can be included in continuous spacer 5 in order to remove moisture from the insulating gas occupied space between glass panes 1 and 2. Useful desiccants are those that do not adsorb the insulating gas/gases filling the interior of the insulated glass unit.

Suitable low thermal conductivity gases and mixtures of such gases for use in the insulated glass unit are well know and include transparent gases such as air, carbon dioxide, sulfur hexafluoride, nitrogen, argon, krypton, xenon, and the like, and mixtures thereof.

Suitable silanol-terminated diorganopolysiloxanes (a) include those of the general formula:

$$M_a D_b D'_c$$

wherein "a" is 2, and "b" is equal to or greater than 1 and "c" is zero or positive; M is $$(HO)_{3-x-y} R^1_x R^2_y SiO_{1/2}$$

wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is $$R^3 R^4 SiO_{1/2};$$

wherein $R^3$ and $R^4$ each independently is a monovalent hydrocarbon group up to 60 carbon atoms; and D' is $$R^5 R^6 SiO_{2/2}$$

wherein $R^5$ and $R^6$ each independently is a monovalent hydrocarbon group up to 60 carbon atoms.

Suitable crosslinkers (b) for the silanol-terminated diorganopolysiloxane(s) present in the composition of the invention include alkylsilicates of the general formula:

$$(R^{14}O)(R^{15}O)(R^{16}O)(R^{17}O)Si$$

wherein $R^{14}$, $R^{15}$, $R^{16}$ and $R^{17}$ each independently is a monovalent hydrocarbon group up to 60 carbon atoms. Crosslinkers of this type include, n-propyl silicate, tetraethylortho silicate and methyltrimethoxysilane and similar alkyl-substituted alkoxysilane compounds, and the like.

Suitable catalysts (c) for the crosslinking reaction of the silanol-terminated diorganopolysiloxane(s) can be any of those known to be useful for facilitating the crosslinking of such siloxanes. The catalyst can be a metal-containing or non-metallic compound. Examples of useful metal-containing compounds include those of tin, titanium, zirconium, lead, iron cobalt, antimony, manganese, bismuth and zinc.

In one embodiment of the present invention, tin-containing compounds useful as crosslinking catalysts include dibutyltindilaurate, dibutyltindiacetate, dibutyltindimethoxide, tinoctoate, isobutyltintriceroate, dibutyltinoxide, soluble dibutyl tin oxide, dibutyltin bis-diisooctylphthalate, bistripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates, and the like. Useful titanium-containing catalysts include chelated titanium compounds, e.g., 1,3-propanedioxytitanium bis(ethylacetoacetate); di-isopropoxytitanium bis(ethylacetoacetate), and tetraalkyl titanates, e.g., tetra n-butyl titanate and tetrasopropyl titanate. In yet another embodiment of the present invention, diorganotin bis β-diketonates is used for facilitating crosslinking in silicone sealant composition.

The curable sealant composition herein includes at least one organic nanoclay filler (d). Nanoclays possess a unique morphology with one dimension being in the nanometer range. The nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

The term "exfoliation" as used herein describes a process wherein packets of nanoclay platelets separate from one another in a polymer matrix. During exfoliation, platelets at the outermost region of each packet cleave off, exposing more platelets for separation.

The term "gallery" as used herein describes the space between parallel layers of clay platelets. The gallery spacing changes depending on the nature of the molecule or polymer occupying the space. An interlayer space between individual nanoclay platelets varies, again depending on the type of molecules that occupy the space.

The term "intercalant" as used herein includes any inorganic or organic compound that is capable of entering the clay gallery and bonding to its surface.

The term "intercalate" as used herein designates a clay-chemical complex wherein the clay gallery spacing has increased due to the process of surface modification. Under the proper conditions of temperature and shear, an intercalate is capable of exfoliating in a resin matrix.

The expression "low permeability to gas(es)" as applied to the cured composition of this invention shall be understood to mean an argon permeability coefficient of not greater than about 900 barrers (1 barrer=$10^{-10}$ (STP)/cm sec(cmHg)) measured in accordance with the constant pressure variable-volume method at a pressure of 100 psi and temperature of 25° C.

The expression "modified clay" as used herein designates a clay material that has been treated with any inorganic or organic compound that is capable of undergoing ion exchange reactions with the cations present at the interlayer surfaces of the clay.

The term "nanoclay" as used herein describes clay materials that possess a unique morphology with one dimension being in the nanometer range. Nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

The expression "organic nanoclay" as use herein describes a nanoclay that has been treated or modified with an organic intercalant, e.g., diorganopolysiloxane that ionically bonds to surfaces in between the layers making up the clay particles.

The term "organoclay" as used herein designates a clay or other layered material that has been treated with organic molecules (variously referred to as "exfoliating agents," "surface modifiers" or "intercalants") that are capable of undergoing ion exchange reactions with the cations present at the interlayer surfaces of the clay.

The nanoclays can be natural or synthetic materials. This distinction can influence the particle size and for this invention, the particles should have a lateral dimension of between about 0.01 μm and about 5 μm, and preferably between about 0.05 μm and about 2 μm, and more preferably between about 0.1 μm and about 1 μm. The thickness or the vertical dimension of the particles can in general vary between about 0.5 nm and about 10 nm and preferably between about 1 nm and about 5 nm.

Useful nanoclays for providing the organic nanoclay filler component of the composition of the invention include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, vermiculite, halloysite, aluminate oxides, or hydrotalcites, and the like, and their mixtures. In another embodiment, useful nanoclays include micaceous minerals such as illite and mixed layered illite/smectite minerals such as rectorite, tarosovite, ledikite and admixtures of illites with one or more of the clay minerals named above. Any swellable layered material that sufficiently sorbs the organic molecules to increase the interlayer spacing between adjacent phyllosilicate platelets to at least about 5 angstroms, or to at least about 10 angstroms, (when the phyllosilicate is measured dry) can be used in producing the filler component to provide the cured sealant composition of the invention.

In one embodiment of the present invention, organic compounds that are useful for treating nanoclays and layered materials to provide the filler component herein include cationic surfactants such as ammonium, ammonium chloride, alkylammonium (primary, secondary, tertiary and quaternary), phosphonium or sulfonium derivatives of aliphatic, aromatic or arylaliphatic amines, phosphines or sulfides.

Other organic treating agents for nanoclays that can be used herein include amine compounds and/or quarternary ammonium compounds $R^6R^7R^8N^+X^-$ each independently is an alkoxy silane group, alkyl group or alkenyl group of up to 60 carbon atoms and X is an anion such as $Cl^-$, $F^-$, $SO_4^-$, etc.

Optionally, the curable sealant composition herein can also contain at least one solid polymer having a permeability to gas that is less than the permeability of the crosslinked diorganopolysiloxane. Suitable polymers include polyethylenes such as low density polyethylene (LDPE), very low density polyethylene (VLDPE), linear low density polyethylene (LL-DPE) and high density polyethylene (HDPE); polypropylene (PP), polyisobutylene (PIB), polyvinyl acetate (PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene fluoride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone, polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

The optional polymer(s) can also be elastomeric in nature, examples include, but are not limited to ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These optional polymers can be blended either alone or in combinations or in the form of copylymers, e.g. polycarbonate-ABS blends, polycarbonate polyester blends, grafted polymers such as, silane grafted polyethylenes, and silane grafted polyurethanes.

In one embodiment of the present invention, the cured sealant composition 7 contains a polymer selected from the group consisting of low density polyethylene (LDPE), very low density polyethylene (VLDPE), linear low density polyethylene (LLDPE), high density polyethylene (HDPE), and mixtures thereof. In another embodiment of the invention, the cured sealant composition 7 has a polymer selected from the group consisting of low density polyethylene (LDPE), very low density polyethylene (VLDPE), linear low density polyethylene (LLDPE), and mixture thereof. In yet another embodiment of the present invention, the optional polymer is a linear low density polyethylene (LLDPE).

The curable sealant composition can contain one or more other fillers in addition to organic nanoclay component (d). Suitable additional fillers for use herein include precipitated and colloidal calcium carbonates which have been treated with compounds such as stearic acid or stearate ester; reinforcing silicas such as fumed silicas, precipitated silicas, silica gels and hydrobized silicas and silica gels; crushed and ground quartz, alumina, aluminum hydroxide, titanium hydroxide, diatomaceous earth, iron oxide, carbon black, graphite, mica, talc, and the like, and mixture thereof.

The curable sealant composition can also include one or more alkoxysilanes as adhesion promoters. Useful adhesion promoters include N-2-aminoethyl-3-aminopropyltriethoxysilane, γ-aminopropyltriethoxysilane, γ-aminopropyltrimethoxysilane, aminopropyltrimethoxysilane, bis-γ-trimethoxysilypropyl)amine, N-phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3-dimethylbutyltrimethoxysilane, and N-ethyl-3-trimethoxysilyl-2-methylpropanamine, and the like. In one embodiment, the adhesion promoter can be a combination of n-2-aminoethyl-3-aminopropyltrimethoxysilane and 1,3,5-tris(trimethoxysilylpropyl)isocyanurate.

The compositions of the present invention can also include one or more non-ionic surfactants such as polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof.

The curable sealant composition can include still other ingredients that are conventionally employed in RTC silicone-containing compositions such as colorants, pigments, plasticizers, reinforcing fillers, antioxidants, UV stabilizers, biocides, etc., in known and conventional amounts provided they do not interfere with the desired properties.

The amounts of silanol-terminated diorganopolysiloxane(s), crosslinker(s), crosslinking catalyst(s), organic nanoclay(s), optional solid polymers(s) of lower gas permeability than the crosslinked diorganopolysiloxane(s), optional filler(s) other than organic nanoclay, optional adhesion promoter(s) and optional ionic surfactant(s) can vary widely and, advantageously, can be selected from among the ranges indicated in the following table.

TABLE 1

Ranges of Amounts (Weight Percent) of Components of the Cured Sealant Composition 7 of the Invention

| Components of the Cured Sealant Composition | First Range | Second Range | Third Range |
| --- | --- | --- | --- |
| Silanol-terminated Diorganopolysiloxane(s) | 50-99 | 70-99 | 80-85 |
| Crosslinker(s) | 0.1-10 | 0.3-5 | 0.5-1.5 |
| Crosslinking Catalyst(s) | 0.001-1 | 0.003-0.5 | 0.005-0.2 |
| Organic Nanoclay(s) | 0.1-50 | 10-30 | 15-20 |
| Solid Polymer(s) of Lower Gas Permeability than Crosslinked Dioganopoly-Siloxane(s) | 0-50 | 5-40 | 10-35 |
| Filler(s) other than Organic Nanoclay | 0-90 | 5-60 | 10-40 |
| Silane Adhesion Promoter(s) | 0-20 | 0.1-10 | 0.5-2 |
| Ionic Surfactant(s) | 0-10 | 0.1-5 | 0.5-0.75 |

The cured sealant compositions herein can be obtained by procedures that are well known in the art, e.g., melt blending, extrusion blending, solution blending, dry mixing, blending in a Banbury mixer, etc., in the presence of moisture to provide a substantially homogeneous mixture.

Preferably, the methods of blending the diorganopolysiloxane polymers with polymers may be accomplished by contacting the components in a tumbler or other physical blending means, followed by melt blending in an extruder. Alternatively, the components can be melt blended directly in an extruder, Brabender or any other melt blending means.

Cured sealant composition 7 is obtained by curing the curable composition obtained by mixing (a) at least one diorganopolysiloxane, (b) at least one crosslinker for the diorganopolysiloxane(s), (c) at least one catalyst for the crosslinking reaction, (d) at least one organic nanoclay and, optionally, (e) at least one solid polymer having a permeability to gas that is less than the permeability of the crosslinked diorganopolysiloxane(s), the composition following curing exhibiting low permeability to gas(es).

The invention is illustrated by the following non-limiting examples.

COMPARATIVE EXAMPLE 1 AND EXAMPLES 1-4

A mixture of silanol-terminated polydimethylsiloxanes (PDMS), specifically, Silanol 5000, a silanol-terminated polydimethylsiloxane of 5000 cs nominal and Silanol 50,000, a silanol-terminated polydimethylsiloxane of 50,000 cs nominal, both available from Gelest, Inc., were mixed in a 100 ml cup with Cloisite 15A ("C-15A," a montmorillonite clay modified with 125 milliequivalants of dimethyl dehydrogenated tallow ammonium chloride per 100 g of clay available from Southern Clay Products) or SF ME100 (a synthetic fluorohectorite having the general formula $NaMg_{2.5}Si_4O_{10}(F_\alpha OH_{1-\alpha})_2$ ($0.8<=\alpha<=1.0$) available from Unicorp, Japan) employing a hand blender for 10-15 minutes and thereafter placed in a vacuum dessicator for 5 minutes to remove air bubbles generated during mixing. Blends were made with the amounts of nanoclay ranging from 1 to 10 weight percent.

Following the foregoing procedure, cured compositions of the following Examples were obtained:
  Comparative Example 1: 50 grams mix (Silanol 5000 and Silanol 50000@50:50)
  Example 1: 48.75 grams mix (Silanol 5000 and Silanol 50000@50:50)+1.25 grams of Cloisite C-15A clay
  Example 2: 47.5 grams mix (Silanol 5000 and Silanol 50000@50:50)+2.5 grams of Cloisite C-15A clay
  Example 3: 45 grams mix (Silanol 5000 and Silanol 50000@50:50)+5 grams of Cloisite C-15A clay
  Example 4: 45 grams mix (Silanol 5000 and Silanol 50000@50:50)+5 grams of SF ME100 clay The above-indicated blends were then used to make cured sheets as follows: PDMS-nanoclay formulations were mixed with n-propyl silicate ("NPS," acrosslinker) and solubilized dibutyl tin oxide ("DBTO," a crosslinking catalyst), as listed in Table 2, using a hand blender for 5-7 minutes with air bubbles being removed by vacuum. Each blend was poured into a Teflon sheet-forming mold and maintained for 24 hours under ambient conditions (25° C. and 50% humidity) to partially cure the PDMS components. The partially cured sheets were removed from the mold after 24 hours and maintained at ambient temperature for seven days for complete curing.

TABLE 2

| | grams | wt % NPS | wt % DBTO |
| --- | --- | --- | --- |
| Comparative Example 1: Silanol mixture | 50 | 2 | 1.2 |
| Example 1: Silanol mixture with 2.5 wt % C-15A | 50 | 2 | 1.2 |
| Example 2: Silanol mixture with 5 wt % C-15A | 50 | 2 | 1.2 |
| Example 3: Silanol mixture with 10 wt % C-15A | 50 | 2 | 1.2 |
| Example 4: Silanol mixture with 10 wt % SF ME100 | 50 | 2 | 1.2 |

The argon permeability of the foregoing cured composition was measured using a gas permeability set-up. The measurements were based on the variable-volume method at 100 psi pressure and at a temperature of 25° C. The permeability measurements were repeated under identical conditions 2-3 times in order to assure their reproducibility.

Figure 2:
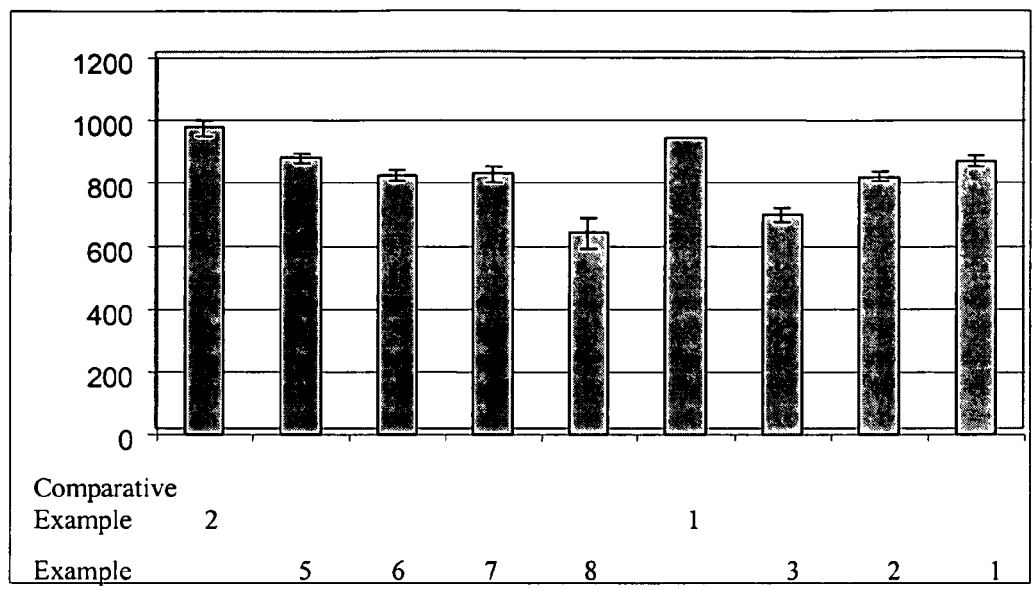
FIG. 2 is a graphic presentation of permeability data for the sealant compositions of Comparative Examples 1-2, Examples 1-3 and 5-8.
Figure 3:
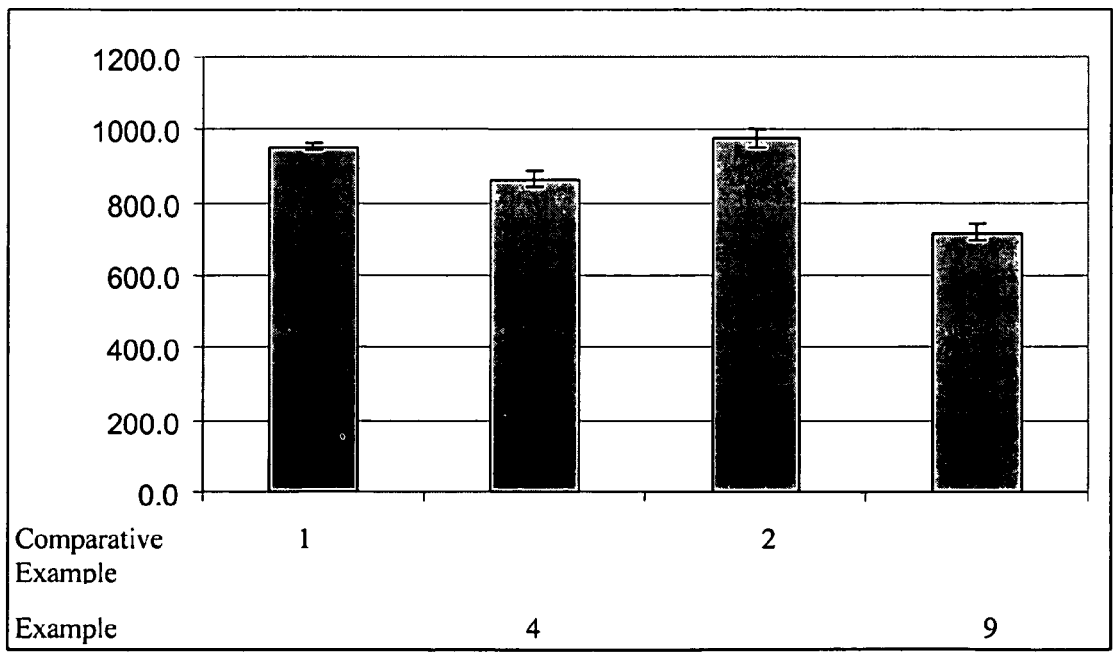
FIG. 3 is a graphic presentation of permeability data for the sealant compositions of Comparative Examples 1-2 and Examples 4 and 9.

The permeability data are graphically presented in FIGS. 2 and 3.

COMPARATIVE EXAMPLE 2 AND EXAMPLES 5-9

To provide a 1 weight percent C-15A clay (see Example 5, Table 3): 227.7 g of OMCTS (octamethylcyclotetrasiloxane) and 2.3 g of C-15A were introduced into a three-neck round bottom flask fitted with overhead stirrer and condenser. The mixture was stirred at 250 rpm for 6 hours at ambient temperature. The temperature was increased to 175° C. while stirring was continued. 0.3 g of CsOH in 1 ml of water was added to the reaction vessel through a septum. After 15 minutes, polymerization of OMCTS began and 0.5 ml of water was then added with an additional 0.5 ml of water being added after 5 minutes. Heating and stirring were continued for 1 hour after which 0.1 ml of phosphoric acid was added for neutralization. The pH of the reaction mixture was determined after 30 minutes. Stirring and heating were continued for another 30 minutes and the pH of the reaction mixture was again determined to assure complete neutralization. Distillation of cyclics was carried out at 175° C. and the mixture was thereafter cooled to room temperature.

The same procedure was followed with 2.5, 5 and 10 wt % of C-15A (see Examples 6-8, Table 3).

Similar in-situ polymerization procedures were followed with 10 wt % high aspect ratio clay (SF ME100) (see Example 9, Table 3). The in-situ polymer with different amounts of clay were then used to make cured sheets as follows: In-situ PDMS-nanoclay formulations were mixed with NPS crosslinker and solubilized DBTO catalyst using a hand blender for 5-7 min with air bubbles being removed by vacuum. The mixture was then poured into a Teflon sheet-forming mold and maintained for 24 hours under ambient conditions (25° C. and 50% humidity). The partially cured sheets were removed from the mold after 24 hours and maintained at ambient temperature for seven days for complete curing.

TABLE 3

|  | grams | wt % NPS | wt % DBTO |
|---|---|---|---|
| Comparative Example 2: Silanol mixture | 50 | 2 | 1.2 |
| Example 5: In-situ silanol with 1 wt % C-15A | 50 | 2 | 1.2 |
| Example 6: In-situ silanol with 2.5 wt % C-15A | 50 | 2 | 1.2 |
| Example 7: In-situ silanol with 5 wt % C-15A | 50 | 2 | 1.2 |
| Example 8: In-situ silanol with 10 wt % C-15A | 50 | 2 | 1.2 |
| Example 9: In-situ silanol with 10 wt % SF ME 100 | 50 | 2 | 1.2 |

Argon permeability was measured using a gas permeability set-up as in the previous examples. The measurements were based on the variable-volume method at 100 psi pressure and at a temperature of 25° C. Measurements were repeated under identical conditions 2-3 times in order to assure their reproducibility.

The permeability data are graphically presented in FIGS. 2 and 3. As shown in the data, argon permeability in the case of the cured sealant compositions of the invention (Examples 1-3 and 5-8 of FIG. 2 and Examples 4 and 9 of FIG. 3) was significantly less than that of cured sealant compositions outside the scope of the invention (Comparative Examples 1 and 2 of FIGS. 2 and 3). In all, while the argon permeability coefficients of the sealant compositions of Comparative Examples 1 and 2 exceed 900 barrers, those of Examples 1-9 illustrative of sealant compositions of this invention did not exceed 900 barrers and in some cases, were well below this level of argon permeability coefficient (see, in particular, examples 3, 8 and 9).

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. An insulated glass unit comprising two spaced-apart sheets of glass in spaced relationship to each other, a low thermal conductivity insulating gas or mixture of gases therebetween and a gas sealant element including a cured sealant composition having a permeability to gas of less than 900 banners, the cured sealant composition resulting from the curing of a curable sealant composition comprising:
    a) at least one silanol-terminated diorganopolysiloxane;
    b) at least one crosslinker for the silanol-terminated diorganopolysiloxane(s) having the formula:

where $R^{14}$, $R^{15}$, $R^{16}$ and $R^{17}$ are chosen independently from monovalent $C_1$ to $C_{60}$ hydrocarbon radicals;
    c) at least one catalyst for a crosslinking reaction wherein the silanol terminated diorganopolysiloxane is crosslinked to provide a crosslinked diorganopolysiloxane;
    d) at least 15 percent up to 50 percent by weight, based on the total composition weight, of at least one organic nanoclay including a diorganopolysiloxane intercalant, where the nanoclay portion of organic nanoclay (d) is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof, the nanoclay portion being treated by at least one of a tertiary alkylammonium compound, tertiary amine compound $R^3\ R^4\ R^5N$ and/or quaternary ammonium compound $R^6\ R^7\ R^8R^9N^+X^-$ wherein $R^3$, $R^4$, $R^5$, $R^6$, $R^7$, $R^8$, and $R^9$ each independently is an alkyl, alkenyl or alkoxy silane group of up to 60 carbon atoms and $X^-$ is an anion to provide the organic portion of the organic nanoclay (d); and,
    e) at least one solid polymer having a permeability to gas that is less than the permeability of the crosslinked diorganopolysiloxane(s),
    wherein said insulated glass unit further includes a spacer member disposed between the two sheets of glass, the spacer member having two lateral sides and an end surface, and wherein the low thermal conductivity gas includes one or more of air, carbon dioxide, sulfur hexafluoride, nitrogen, argon, krypton or xenon, and
    wherein the cured sealant composition includes a nonionic surfactant selected from the group consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof.

2. The insulated glass unit of claim 1 wherein silanol-terminated diorganopolysiloxane (a) has the general formula:

$$M_a D_b D'_c$$

wherein "a" is 2, and "b" is equal to or greater than 1 and "c" is zero or positive; M is $$(HO)_{3-x-y} R^1_x R^2_y SiO_{1/2}$$

wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is $$R^3 R^4 SiO_{1/2};$$

wherein $R^3$ and $R^4$ each independently is a monovalent hydrocarbon group up to 60 carbon atoms; and D' is $$R^5 R^6 SiO_{2/2}$$

wherein $R^5$ and $R^6$ each independently is a monovalent hydrocarbon group up to 60 carbon atoms.

3. The insulated glass unit of claim 1 wherein catalyst (c) is a tin catalyst.

4. The insulated glass unit of claim 3 wherein the tin catalyst is selected from the group consisting of dibutyltindilaurate, dibutyltindiacetate, dibutyltindimethoxide, tinoctoate, isobutyltintriceroate, dibutyltinoxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis b-diketonates and mixtures thereof.

5. The insulated glass unit of claim 1 wherein solid polymer (e) is selected from the group consisting of low density polyethylene, very low density polyethylene, linear low density polyethylene, high density polyethylene, polypropylene, polyisobutylene, polyvinyl acetate, polyvinyl alcohol, polystyrene, polycarbonate, polyethylene terephthalate, polybutylene terephthalate, polyethylene napthalate, glycol-modified polyethylene terephthalate, polyvinylchloride, polyvinylidene chloride, polyvinylidene fluoride, thermoplastic polyurethane, acrylonitrile butadiene styrene, polymethylmethacrylate, polyvinyl fluoride, polyamides, polymethylpentene, polyimide, polyetherimide, polether ether ketone, polysulfone, polyether sulfone, ethylene chlorotrifluoroethylene, polytetrafluoroethylene, cellulose acetate, cellulose acetate butyrate, plasticized polyvinyl chloride, ionomers, polyphenylene sulfide, styrene-maleic anhydride, modified polyphenylene oxide, ethylene-propylene rubber, polybutadiene, polychloroprene, polyisoprene, polyurethane, styrene-butadiene-styrene, styrene-ethylene-butadiene-styrene, polymethylphenyl siloxane and mixtures thereof.

6. The insulated glass unit of claim 1 wherein the curable sealant composition further comprises at least one optional component selected from the group consisting of adhesion promoter, surfactant, colorant, pigment, plasticizer, filler other than organic nanoclay, antioxidant, UV stabilizer, and biocide.

7. The insulated glass unit of claim 6 wherein the adhesion promoter is selected from the group consisting of n-2-aminoethyl-3-aminopropyltrimethoxysilane, 1,3,5-tris(trimethoxysilylpropyl)isocyanurate, γ-aminopropyltrimethoxysilane, γ-aminopropyltrimethoxysilane, aminopropyltriMethoxysilane, bis-γ-trimethoxysilylpropyl)amine, N-phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, γ-cyanoethyltrimethousilane, β-acryloxypropyltrimethoxysilane, β-methacryloxypropylmethyldimethoxysilane, 4-amino-3,3, -dimethylbutyltrimethoxysilane, n-ethyl-3-trimethoxysilyl-2-methylpropanamine, and mixtures thereof.

8. The insulated glass unit of claim 6 wherein the filler other than the organic nanoclay is selected from the group consisting of calcium carbonate, precipitated calcium carbonate, colloidal calcium carbonate, calcium carbonate treated with compounds stearate or stearic acid, fumed silica, precipitated silica, silica gels, hydrophobized silicas, hydrophilic silica gels, crushed quartz, ground quartz, alumina, aluminum hydroxide, titanium hydroxide, clay, kaolin, bentonite, montmorillonite, diatomaceous earth, iron oxide, carbon black and graphite, mica, talc, and mixtures thereof.

9. The insulated glass unit of claim 1 wherein the nonionic surfactant is selected from the group consisting of copolymers of silicones and polyethers, and copolymers of silicones and copolymers of ethylene oxide and propylene oxide.

10. The insulated glass unit of claim 1 wherein the nonionic surfactant is selected from the group consisting of copolymers of ethylene oxide and propylene oxide, copolymers of silicones and polyethers, copolymers of silicones and copolymers of ethylene oxide and propylene oxide and mixtures thereof.

11. The insulated glass unit of claim 1 wherein:
silanol-terminated diorganopolysiloxane (a) has the general formula:

$$M_a D_b D'_c$$

wherein "a" is 2, and "b" is equal to or greater than 1 and "c" is zero or positive; M is $$(HO)_{3-x-y} R^1_x R^2_y SiO_{1/2}$$

wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is $$R^3 R^4 SiO_{1/2};$$

wherein $R^3$ and $R^4$ each independently is a monovalent hydrocarbon group up to 60 carbon atoms; and D' is $$R^5 R^6 SiO_{2/2}$$

wherein $R^5$ and $R^6$ each independently is a monovalent hydrocarbon group up to 60 carbon atoms;
catalyst (c) is a tin catalyst; and,
nanoclay portion of organic nanoclay (d) is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof, the nanoclay portion being treated by at least one tertiary amine compound $R^3$ $R^4$ $R^5N$ and/or quaternary ammonium compound $R^6$ $R^7$ $R^8 R^9 N^+ X^-$ wherein $R^3$, $R^4$, $R^5$, $R^6$, $R^7$, $R^8$, and $R^9$ each independently is an alkyl, alkenyl or alkoxy silane group of up to 60 carbon atoms and $X^-$ is an anion to provide the organic portion of the organic nanoclay (d).

12. The insulated glass unit of claim 1 wherein the insulating gas is selected from the group consisting of carbon dioxide, nitrogen, and mixtures thereof.

13. The insulated glass unit of claim 1 wherein the solid polymer (e) is elastomeric and is selected from the group consisting of ethylene-propylene rubber, polybutadiene, polychloroprene, polyisoprene, styrene-butadiene-styrene, styrene-ethylene-butadiene-styrene, polymethylphenyl siloxane, and combinations thereof.

14. The insulated glass unit of claim 1, wherein each lateral side of said spacer unit is spaced apart from a respective sheet of glass so as to form a gap therebetween, both said gaps being partially filled with a primary sealant comprising a rubber based polymeric material and partially filled with said cured sealant composition.

15. The insulated glass unit of claim 14 wherein the primary sealant comprises one or more of polyisobutylene, butyl rubber, polysulfide, EPDM rubber, nitrile rubber, polyisobutylene/polyisoprene copolymers, polyisobutylene polymers, brominated olefin polymers, copolymers of polyisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, and styrene butadiene polymers.

16. The insulated glass unit of claim 14 wherein at least some of the cured sealant composition is disposed in adjacent contact with said end surface of the spacer and extending between said two sheets of glass such that at least a portion of the spacer is embedded in the cured sealant composition.

17. The insulated glass unit of claim 1 wherein the organic nanoclay includes layered particles having a lateral dimension of between 0.01 μm and 5 μm, and a thickness of from 0.5 nm to 10 nm.

* * * * *